(12) United States Patent
Nannoni et al.

(10) Patent No.: US 8,490,919 B2
(45) Date of Patent: Jul. 23, 2013

(54) RETRACTABLE HELICOPTER LANDING GEAR

(75) Inventors: Fabio Nannoni, Samarate (IT); Dante Ballerio, Samarate (IT)

(73) Assignee: AGUSTA S.p.A., Samarate (IT)

( * ) Notice: Subject to any disclaimer, the term of this patent is extended or adjusted under 35 U.S.C. 154(b) by 349 days.

(21) Appl. No.: 12/980,967

(22) Filed: Dec. 29, 2010

(65) Prior Publication Data

US 2011/0155845 A1   Jun. 30, 2011

(30) Foreign Application Priority Data

Dec. 30, 2009   (EP) .................................... 09425545

(51) Int. Cl.
*B64C 25/52* (2006.01)
(52) U.S. Cl.
USPC ........................................................ 244/108
(58) Field of Classification Search
USPC ............... 244/108, 103 R, 100 R, 207, 17.11
See application file for complete search history.

(56) References Cited

U.S. PATENT DOCUMENTS

| | | | | |
|---|---|---|---|---|
| 1,844,295 A * | 2/1932 | Perry | .................. | 244/100 R |
| 2,548,832 A * | 4/1951 | Tydon | .................. | 244/101 |
| 2,733,026 A * | 1/1956 | Ditter | .................. | 244/108 |
| 2,842,325 A | 7/1958 | Green et al. | | |
| 2,918,234 A | 12/1959 | McConica | | |
| 2,925,970 A * | 2/1960 | Heaslip | .................. | 244/108 |
| 3,128,065 A * | 4/1964 | Landes | .................. | 244/108 |
| 4,026,502 A | 5/1977 | Masclet | | |
| 5,570,857 A | 11/1996 | Landes et al. | | |
| 7,284,726 B2 * | 10/2007 | Fabian et al. | .............. | 244/17.11 |
| 7,407,134 B2 * | 8/2008 | Bietenhader | .............. | 244/102 A |
| 7,500,678 B1 * | 3/2009 | Whiting | .................. | 280/9 |
| 8,038,095 B2 * | 10/2011 | Herzberger et al. | .......... | 244/101 |

OTHER PUBLICATIONS

European Search Report of Application No. 09425545 Dated May 10, 2010.

* cited by examiner

*Primary Examiner* — Tien Dinh
(74) *Attorney, Agent, or Firm* — Venable LLP; Robert Kinberg

(57) ABSTRACT

A retractable helicopter landing gear has a suspension structure supporting one wheel, and is movable between a withdrawn position, to reduce drag on the helicopter, and a lowered position for landing and takeoff of the helicopter. The landing gear also has a skid, which is located between the axis of rotation of the wheel and the periphery of the wheel, is diametrically opposite the suspension structure, and is connected to the suspension structure by a connecting device having a torsion bar.

10 Claims, 7 Drawing Sheets

US 8,490,919 B2

RETRACTABLE HELICOPTER LANDING GEAR

CROSS-REFERENCE TO RELATED APPLICATION

This application claims the priority of European Patent Application No: 09425545.2, filed on Dec. 30, 2009, the subject matter of which is incorporated herein by reference in its entirety.

BACKGROUND OF THE INVENTION

The present invention relates to a retractable helicopter landing gear.

Helicopters are known to comprise a front landing gear, and two rear landing gears fixed to either side of the fuselage. Each has a wheel, and serves to cushion the downward energy of the helicopter when landing.

Landing gears may be fixed or retractable. In flight, retractable landing gears are set to a stowed or withdrawn position, in which the wheels are housed inside housings to reduce drag and fuel consumption of the helicopter, and are moved by hydraulic actuators between the stowed position and a lowered or deployed position for landing or takeoff.

When landing on "soft" ground, such as snow or sand, the wheels must be prevented from sinking into the ground, so as to maintain the attitude of the helicopter when landing, and ensure stable support on the ground and easy takeoff. The same substantially also applies when landing on uneven ground.

This is normally done by attempting to discharge the weight and downward force of the helicopter to the ground over a wider supporting area than that provided by one-wheel landing gears. One known solution is to employ landing gears with two relatively large-diameter wheels, but has the drawback of the additional wheel per landing gear greatly increasing the weight of the helicopter.

As opposed to dual wheels, another known solution is to replace the rear landing gear wheels with skids fixed by steel cables. The relatively large underside surface area of known skids, however, prevents withdrawal of the landing gears, with the result that the skids increase drag and, therefore, fuel consumption, especially on long-range flights.

SUMMARY OF THE INVENTION

It is an object of the present invention to provide a retractable helicopter landing gear designed to provide a simple, low-cost solution to the above problems, and which, in particular, adapts to different types of terrain and landing conditions, and can be produced by making only minor, low-cost alterations to existing one-wheel landing gears.

According to the present invention, there is provided a retractable helicopter landing gear as claimed in the attached claims.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
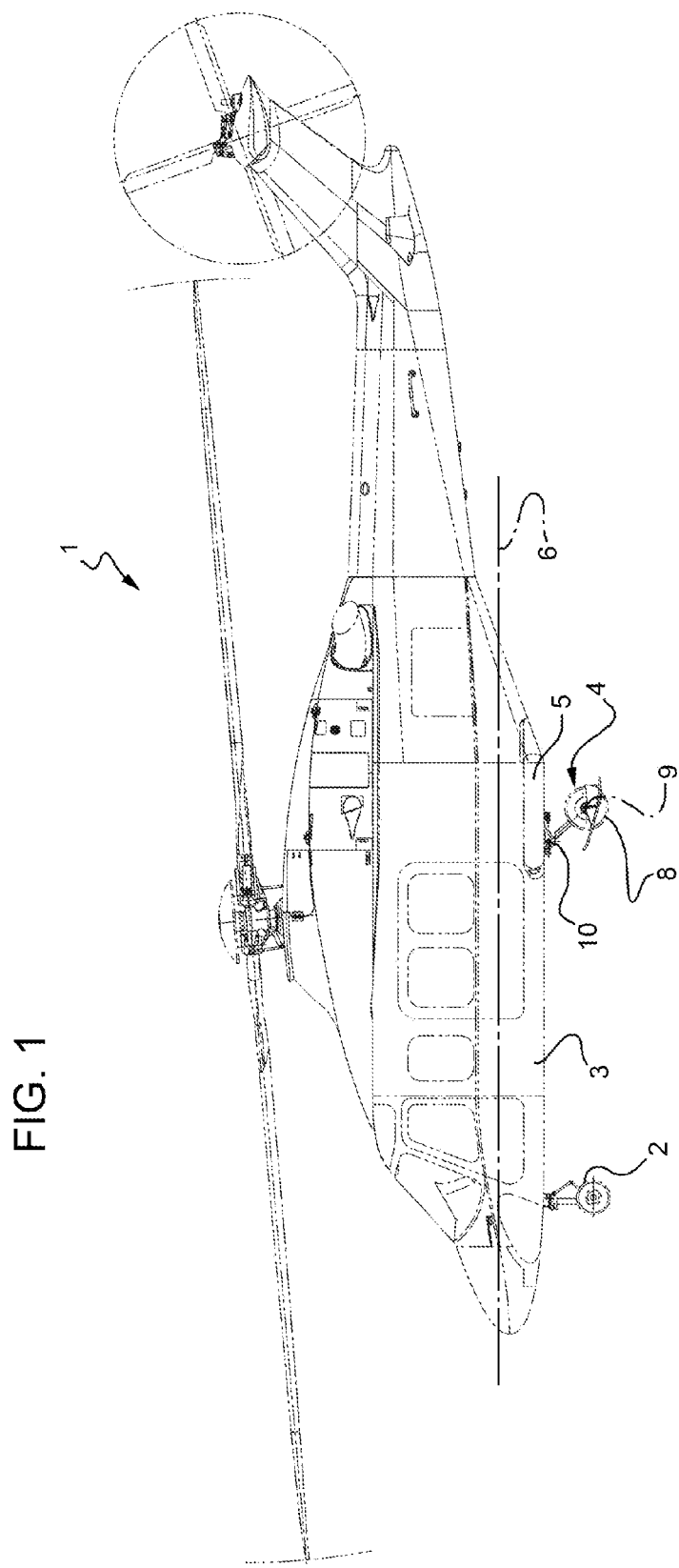
FIG. 1 shows a side view of a preferred embodiment of the retractable helicopter landing gear according to the present invention and in a lowered or deployed position.

Number 1 in FIG. 1 indicates a helicopter comprising: a front landing gear 2 that can be withdrawn into a compartment inside the fuselage 3 of helicopter 1; and two rear landing gears 4 fitted to respective supporting and housing structures 5 fixed to either side of fuselage 3 and symmetrical with respect to the longitudinal travelling direction 6 of helicopter 1.

Figure 3:
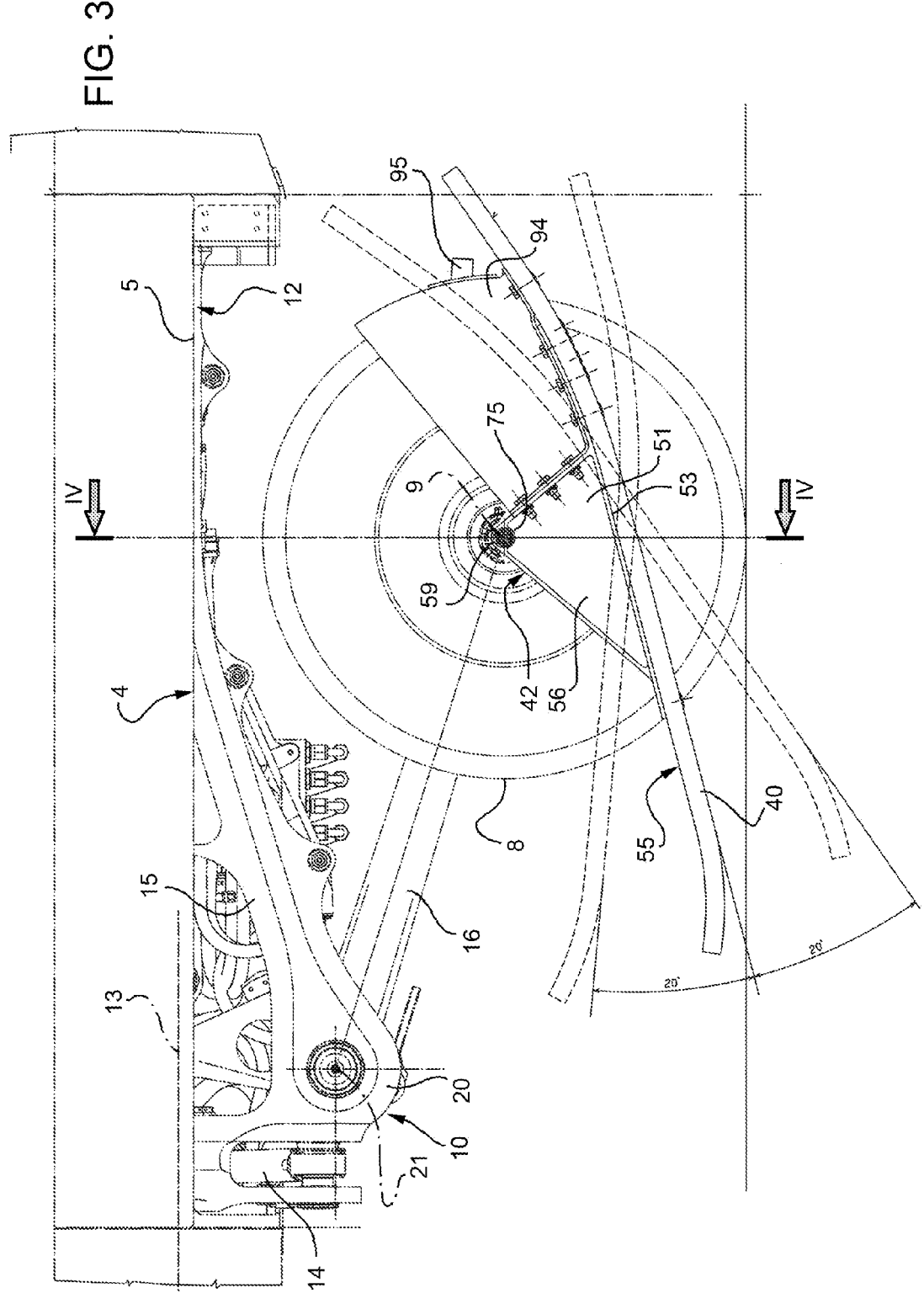
FIG. 3 shows a larger-scale side view of the FIG. 1 landing gear.
Figure 6:
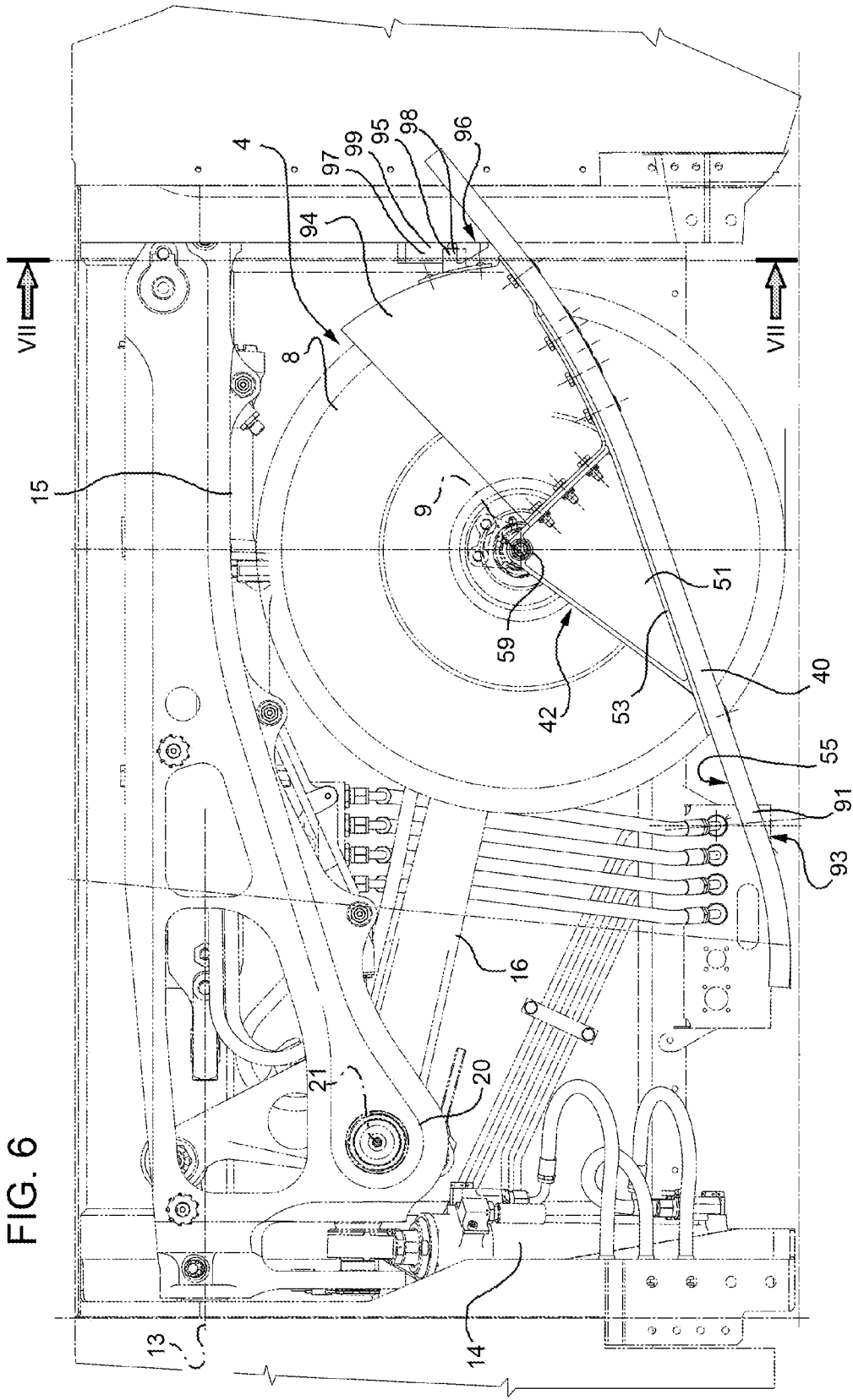
FIG. 6 shows an underside view of the landing gear according to the present invention in a withdrawn or stowed position.

Each landing gear 4 comprises one wheel 8 with an axis of rotation 9; and a suspension structure 10 for securing wheel 8 to structure 5, and which is movable with respect to structure 5 to move landing gear 4 into a deployed or lowered position (FIG. 3) and a stowed or withdrawn position (FIG. 6).

In the deployed position, wheel 8 is lowered for landing and takeoff, with axis 9 positioned horizontally and perpendicular to direction 6. In the stowed position, wheel 8 and structure 10 are withdrawn and stowed in a housing 12 of structure 5, to reduce drag on helicopter 1 as it moves forward. More specifically, structure 5 is connected to structure 10 to rotate about an axis 13, substantially parallel to direction 6, under the control of an actuating device defined by a hydraulic cylinder 14. In the example described, the pressure in the chambers of hydraulic cylinder 14 holds landing gear 4 stably in the deployed or stowed position.

Structure 10 is known, and comprises: a frame 15 hinged to structure 5 about axis 13; and an arm 16, which has one end 17 hinged to a portion 20 of frame 15 about an axis 21 parallel to axis 9, and extends downwards and rearwards in relation to portion 20 when landing gear 4 is in the deployed position. At least one spring and possibly a shock absorber are interposed between arm 16 and frame 15 to keep arm 16 in a reference angular position with respect to frame 15, and to cushion impact as wheel 8 touches ground on landing.

Figure 2:
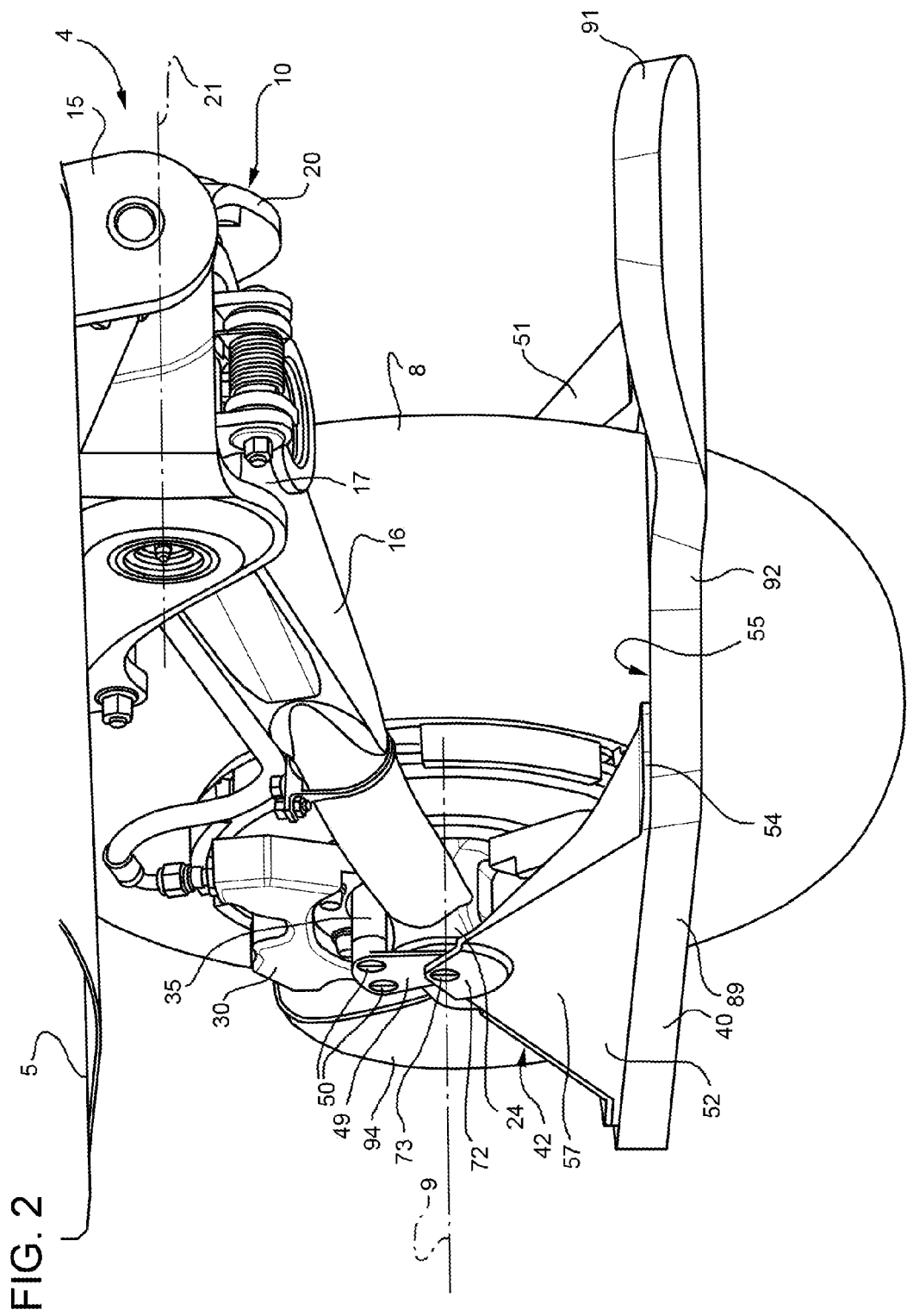
FIG. 2 shows a larger-scale view in perspective of the FIG. 1 landing gear.
Figure 4:
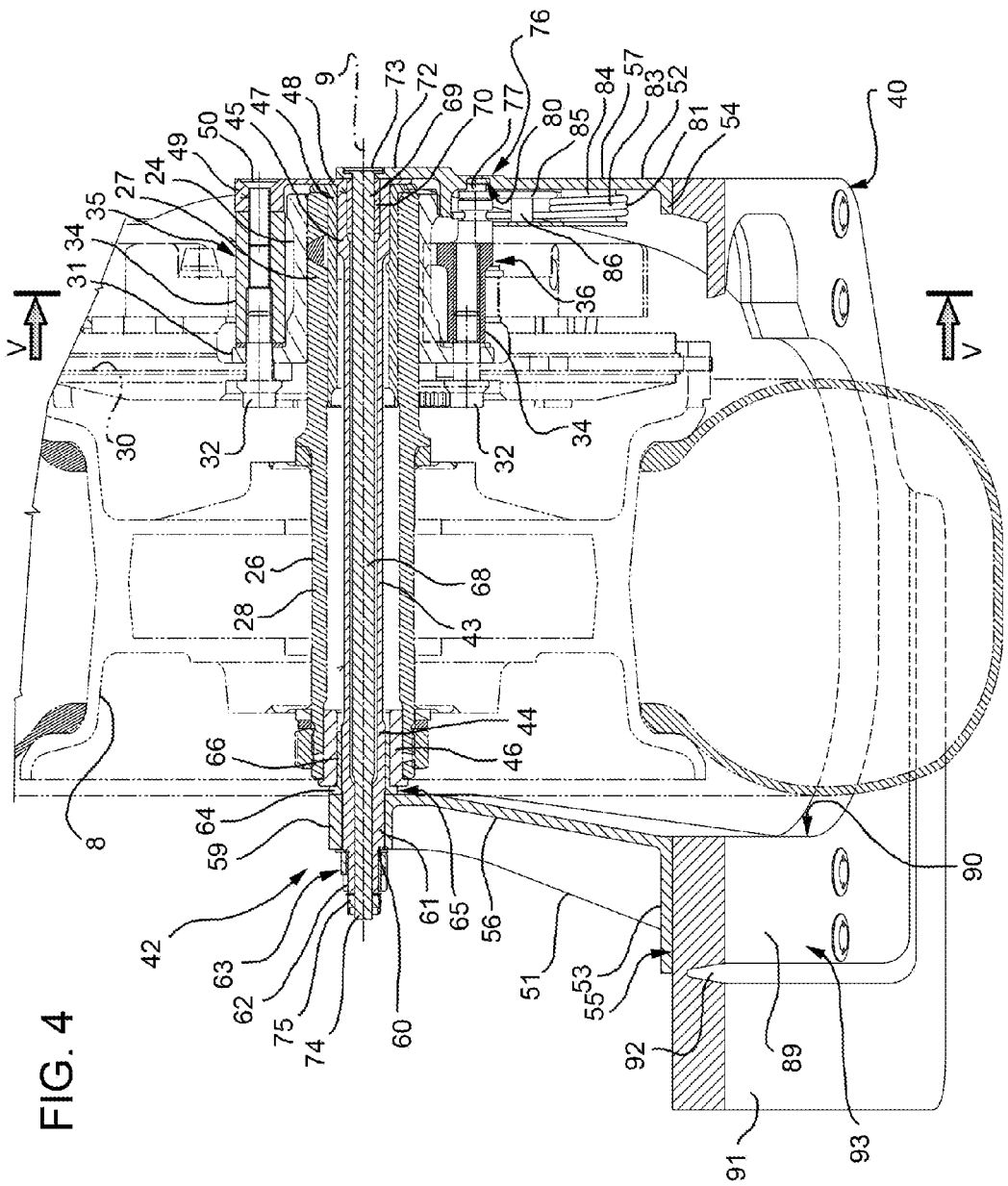
FIG. 4 shows a section along line IV-IV in FIG. 3.

With reference to FIGS. 2 and 4, at the opposite end, arm 16 terminates with an eyelet portion 24, which is coaxial with and located alongside wheel 8, and supports wheel 8 in projecting manner by means of a hollow shaft 26. Hollow shaft 26 comprises two opposite axial portions 27 and 28: portion 27 is fixed inside portion 24; and portion 28 projects from portion 24, and is fitted in hinged manner with the hub of wheel 8.

Landing gear 4 comprises a known brake assembly 30 (not described in detail) fixed to a flange 31 of portion 24 by screws 32, which extend, parallel to axis 9, through flange 31 and are screwed inside holes defined by respective tubular portions 34. Portions 34 are elongated parallel to axis 9, rest axially against flange 31, on the face away from wheel 8, and form part of two bodies 35 and 36 spaced angularly apart to make room for arm 16.

Landing gear 4 also comprises a skid 40, which is located between axis 9 and the periphery of wheel 8, is diametrically opposite structure 10, and is fitted to structure 10 and therefore movable with wheel 8 between the deployed and stowed positions.

Skid 40 is connected to portion 24 of arm 16 by a connecting device 42 comprising a torsion bar 43, which extends inside hollow shaft 26 and comprises two intermediate portions 44, 45 connected to respective axial ends of hollow shaft 26 with the interposition of sleeves 46, 47, which keep torsion bar 43 coaxial with the inner surface of hollow shaft 26 and therefore substantially centred in relation to axis 9. Torsion bar 43 has one end 48 fixed with respect to portion 24 of arm 16. More specifically, end 48 is outside hollow shaft 26, and comprises a radial appendix 49 axially facing sleeve 47 and fixed to body 35 by screws 50 screwed inside the holes defined by portions 34.

Device 42 also comprises two lateral plates 51, 52 located on opposite axial sides of wheel 8 and fixed to skid 40. Plates 51, 52 comprise respective ribs 53, 54 resting on a top surface 55 of skid 40; and respective sidewalls 56, 57 projecting respectively from ribs 53, 54, crosswise to axis 9.

Sidewall 56 comprises a connecting portion 59 fixed to the end 60 of bar 43 opposite end 48. More specifically, end 60 comprises: a portion 61, to which connecting portion 59 is fitted by a splined coupling; and a threaded cylindrical tip 62, to which a nut screw 63 is screwed.

Connecting portion 59 is secured axially between nut screw 63 and a flange 64, which forms part of a bushing 65 also comprising a cylindrical portion 66 interposed radially between portion 44 and sleeve 46. Given the ability of bar 43 to twist, end 48 remains fixed, and end 60 is rotated by skid 40 about axis 9 if skid 40 tilts as it comes to rest on the ground when landing helicopter 1.

More specifically, end 60 can rotate in opposite directions with respect to a reference position corresponding to a condition in which bar 43 is not flexed. The flexibility of bar 43 tends to restore skid 40 and plates 51, 52 to the reference position.

Bar 43 is also defined by a hollow shaft, and houses a coaxial pin 68, which acts as a hinge between an end portion 72 of sidewall 57 and bar 43. More specifically, at one end, pin 68 comprises a portion 69, which is fitted to a cylindrical inner surface of bar 43 by a bushing 70, projects from bar 43 through portion 72, and terminates with an outer head 73 resting axially on portion 72. At the opposite end, pin 68 comprises a threaded portion 74 projecting from bar 43; and a nut screw 75 is screwed to portion 74 and tightened axially against tip 62 to hold pin 68 in a fixed position with respect to end 60.

Bushings 65 and 70 are made of antifriction material, e.g. nylon, and act as bearings for portion 44 of bar 43 and portion 69 of pin 68 respectively, when end 60 rotates with respect to end 48.

A stop device 76 defines the maximum tilt angles of skid 40 with respect to the reference position, and comprises a projection 77 fixed with respect to arm 16; and two stop shoulders fixed with respect to skid 40. More specifically, the stop shoulders are defined by the ends of a groove 80, which is formed in an inner face of sidewall 57, is arc-shaped with its centre coincident with axis 9, and is engaged in sliding manner by projection 77, which is a pin parallel to axis 9 and forming part of body 36. Conversely, the end shoulders may be fixed with respect to arm 16, and the projection movable together with skid 40.

Figure 5:
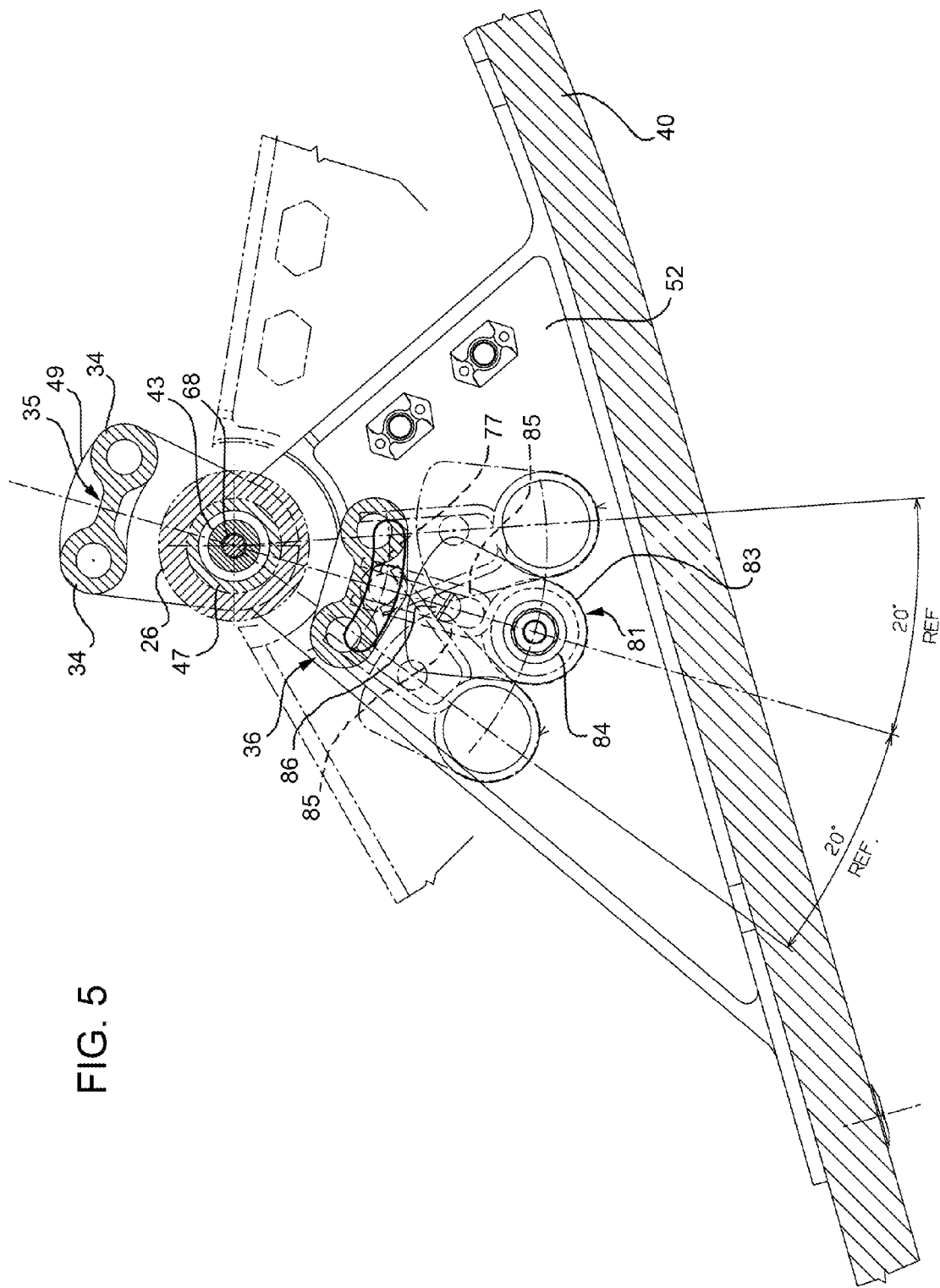
FIG. 5 shows a larger-scale, detailed section of the landing gear along line V-V in FIG. 4.

With reference to FIGS. 4 and 5, a locating spring 81 operates in conjunction with the twisting of bar 43 to restore skid 40 and plates 51, 52 to the reference position with respect to arm 16. Spring 81 is a backup system, which comes into play in the event of failure of bar 43, and is a torsion spring defined by a wire comprising an intermediate portion 83 coiled about a cylindrical support 84 fixed to sidewall 57 and having an axis parallel to axis 9. The wire of spring 81 also comprises two ends 85 projecting outwards from portion 83 and located on opposite sides of projection 77. When skid 40 is in the reference position, projection 77 and support 84 are aligned with a locator 86 fixed with respect to support 84. When skid 40 tilts with respect to arm 16 from the reference position, ends 85 remain resting one against locator 86 and the other against projection 77, and the elasticity of spring 81 tends to realign projection 77 with locator 86, and so restore skid 40 to the reference position.

Viewed from above, skid 40 comprises a portion 89, which is fixed to plates 51, 52, and is C-shaped to define the edge of an opening 90 elongated tangentially to axis 9 and fitted through with wheel 8. Skid 40 also comprises a peripheral portion 91 in front of and to one side of portion 89, and joined to portion 89 by a weak portion 92, which breaks automatically to detach portion 91 from portion 89 in the event of severe pressure (e.g. caused by highly uneven terrain) on the underside surface 93 of skid 40 when landing. In other words, portion 92 acts as a load-limiting device, to prevent excessive force on surface 93 from damaging the rest of landing gear 4, and is preferably weakened by a cut in surface 93.

Figure 7:
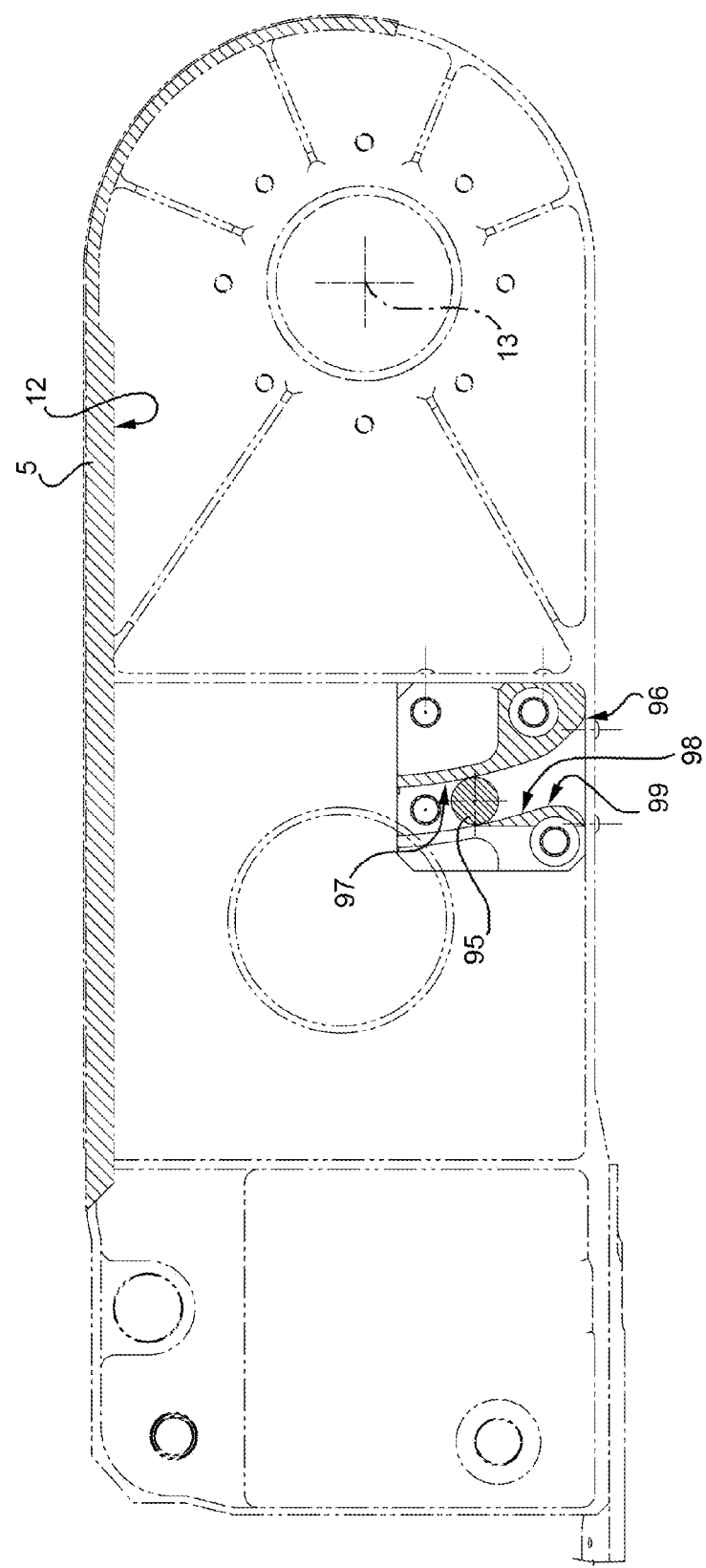
FIG. 7 shows a larger-scale section along line VII-VII in FIG. 6.

As shown in FIG. 6, a guard 94 is fixed, behind wheel 8, to both sides of portion 89 and/or to plates 51, 52, and is fitted with a rear appendix 95, which projects substantially radially to engage a retaining device 96, fixed with respect to structure 5, when landing gear 4 is in the stowed position. With reference to FIG. 7, device 96 comprises two supporting surfaces 97, 98, which define a seat 99 engaged and released by appendix 95 as landing gear 4 rotates about axis 13, and which prevent rotation of appendix 95 either way about axis 9, to prevent skid 40 from vibrating when helicopter 1 is in flight. Alternatively, surfaces 97, 98 may be positioned differently, e.g. to directly retain an edge of skid 40.

When landing gear 4 is in the stowed position, over half of skid 40 is housed inside housing 12, and the rest, including plate 51, remains outside structure 5. When landing gear 4 is set to the deployed position, helicopter 1 can safely land on "soft" or uneven ground, by virtue of skid 40 cooperating with wheel 8 to distribute the weight and downward force of helicopter 1 over the ground when landing, and to define as a whole a relatively extensive supporting area. Skid 40 functions no less effectively than an extra wheel 8 of a two-wheel landing gear, but is considerably lighter.

Given that wheel 8 and skid 40 cooperate synergically to distribute the weight and downward force of helicopter 1 over the ground, skid 40 need not be particularly large, so at least half of it can be accommodated in housing 12.

Given the design characteristics described above, skid 40 and device 42 can be added to existing landing gears relatively easily, and with no impairment in retractability. Device 42, in particular, is relatively compact, and does not affect the characteristics or position of structure 10, brake assembly 30, or wheel 8. In fact, upgrading an existing landing gear with skid 40 substantially involves: making minor alterations to the layout of the oil lines in housing 12; substituting bodies 35, 36 for the nuts normally used to fix screws 32 to flange 31; assembling bar 43 inside a hollow shaft 26; and adding device 96 inside structure 5.

Clearly, changes may be made to landing gear 4 as described and illustrated herein without, however, departing from the scope of the present invention as defined in the accompanying Claims.

In particular, portion 89 may be circular and/or guard 94 may be eliminated; as opposed to combining spring 81 and the torsional flexibility of bar 43, one single elastic locating system may be provided to set skid 40 to a reference angular position about axis 9; and/or the system hinging skid 40 to portion 24 may differ from the one described by way of example.

The invention claimed is:

1. A retractable helicopter landing gear comprising:
    a suspension structure;
    one wheel having an axis of rotation and fitted to said suspension structure to rotate about said axis of rotation;
    actuating means for moving said suspension structure and said wheel between a withdrawn position, to reduce drag on the helicopter, and a lowered position for landing and takeoff of the helicopter;
    a skid located between said axis of rotation and the periphery of said wheel, and diametrically opposite said suspension structure with respect to said axis of rotation;
    connecting means comprising a connecting hinge means connecting said skid to said suspension structure to be rotatable about said axis of rotation; and
    elastic positioning means for maintaining said skid in a reference angular position, wherein said elastic positioning means comprise a torsion bar extending along said axis of rotation.

2. A landing gear as claimed in claim 1, wherein said suspension structure comprises a connecting portion coaxial with and alongside said wheel; and said wheel and said skid are both supported by said connecting portion.

3. A landing gear as claimed in claim 2, wherein said torsion bar extends inside a hollow shaft to which said wheel is fitted, and comprises a first and second end outside said hollow shaft and fixed respectively to said skid and to said connecting portion of said suspension structure.

4. A landing gear as claimed in claim 3, wherein said connecting means comprise a first and second side wall located on opposite axial sides of said wheel, said first side wall being fixed to said first end of said torsion bar, and said second side wall being hinged about said axis of rotation.

5. A landing gear as claimed in claim 3, wherein said second end is fixed to a first body having threaded holes for receiving screws connecting a brake assembly to said connecting portion.

6. A landing gear as claimed in claim 1, further comprising stop means defining a maximum oscillation angle of said skid with respect to said reference angular position; said stop means comprising:
    a projection parallel to said axis of rotation and fixed with respect to either one of said suspension structure and said skid; and
    two stop shoulders fixed with respect to the other of said suspension structure and said skid.

7. A landing gear as claimed in claim 6, wherein said stop shoulders are defined by respective ends of a groove slidably engaged by said projection.

8. A landing gear as claimed in claim 7, wherein said groove is formed on a plate fixed to said skid and located alongside said wheel, said projection being fitted in a fixed position to a connecting portion of said suspension structure.

9. A landing gear as claimed in claim 8, wherein said projection forms part of a second body having threaded holes for receiving screws connecting a brake assembly to said connecting portion.

10. A landing gear as claimed in claim 6, wherein said elastic positioning means comprise a spring which acts on said projection to keep said skid into said reference angular position.

* * * * *